(12) United States Patent
Romolo

(10) Patent No.: US 7,364,213 B2
(45) Date of Patent: Apr. 29, 2008

(54) FRAME ASSEMBLY FOR MOUNTING BABY SEAT IN MOTOR-VEHICLE SEAT

(75) Inventor: Gazza Romolo, Sorbolo (IT)

(73) Assignee: Fair-S.R.L., Sorbolo Levante De Brescello (IT)

( * ) Notice: Subject to any disclaimer, the term of this patent is extended or adjusted under 35 U.S.C. 154(b) by 11 days.

(21) Appl. No.: 10/520,058

(22) PCT Filed: Jun. 20, 2003

(86) PCT No.: PCT/EP03/06503

§ 371 (c)(1),
(2), (4) Date: Dec. 29, 2004

(87) PCT Pub. No.: WO2004/002773

PCT Pub. Date: Jan. 8, 2004

(65) Prior Publication Data

US 2006/0043753 A1 Mar. 2, 2006

(30) Foreign Application Priority Data

Jul. 1, 2002 (AT) ............................. A 981/2002

(51) Int. Cl.
*B60N 2/02* (2006.01)
(52) U.S. Cl. .................................... 296/68.1
(58) Field of Classification Search ............... 296/68.1; 257/250.1, 256.16, 130, 183.2–183.3, 253
See application file for complete search history.

(56) References Cited

U.S. PATENT DOCUMENTS 5,332,285 A * 7/1994 Sinnhuber ................ 297/250.1
6,000,753 A * 12/1999 Cone, II ................ 297/256.16
6,702,379 B2 * 3/2004 Kain ....................... 297/250.1
6,796,606 B2 * 9/2004 Marshall ..................... 297/182
6,796,610 B2 * 9/2004 Nakagawa et al. .... 297/256.16
6,860,557 B2 * 3/2005 Jonasson .................... 297/253
2002/0074840 A1 * 6/2002 Nakagawa et al. .... 297/256.16

(Continued)

FOREIGN PATENT DOCUMENTS

DE          003422695 A1 * 12/1985     .............. 297/250.1

(Continued)

*Primary Examiner*—H Gutman
(74) *Attorney, Agent, or Firm*—Andrew Wilford

(57) ABSTRACT

The invention relates to a fastening frame (3) for fastening a child seat (1) in motor vehicles that are provided with child seat anchoring elements (5), with which the vehicle is equipped and which are assigned to each vehicle seat while being joined in a fixed manner to the vehicle body and/or to the vehicle seat. Said fastening frame (3, 13) comprises a fastening section (23). Anchoring elements (24) for detachably anchoring the fastening frame (3, 13) to the child seat anchoring elements (5), which are joined in a fixed manner to the vehicle, are connected to one end of said fastening section, and a supporting section (8) is connected to the other end. This supporting section is supported in front of the vehicle seat on the vehicle floor (4) or on vehicle body parts and, when the fastening frame is mounted, the supporting section slopes downward toward the front. The inventive child restraint device provides that a child seat (1) is detachably anchored to an aforementioned fastening frame (3, 13) which overlaps the seat surface (2) of a vehicle seat.

15 Claims, 9 Drawing Sheets

U.S. PATENT DOCUMENTS

2006/0055218 A1 * 3/2006 Barker .................... 297/250.1

FOREIGN PATENT DOCUMENTS

| DE | 004137596 A1 * | 5/1993 | ............. 297/250.1 |
|---|---|---|---|
| DE | 004137599 A1 * | 5/1993 | ............. 297/256.16 |
| EP | 000164909 A2 * | 12/1985 | ............. 297/250.1 |
| EP | 000485121 A1 * | 5/1992 | ............. 297/256.16 |
| EP | 000574848 A2 * | 12/1993 | ............. 297/250.1 |

* cited by examiner

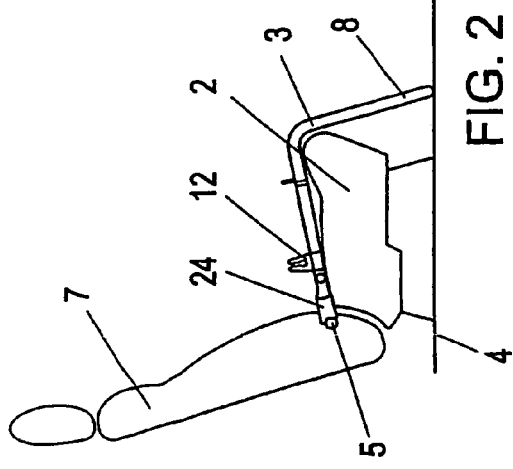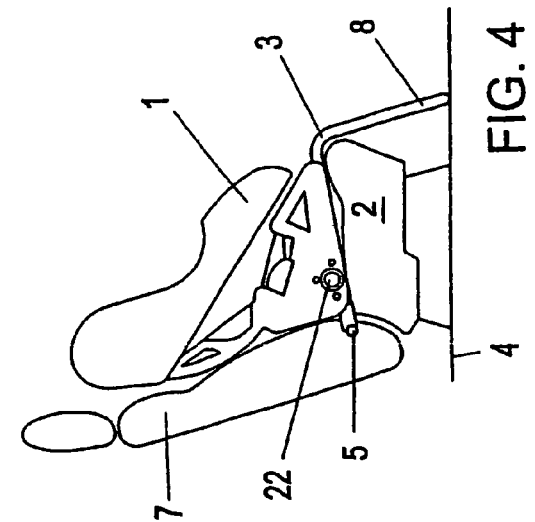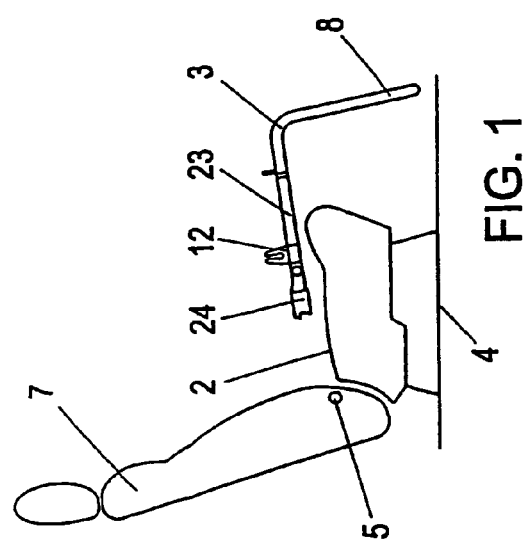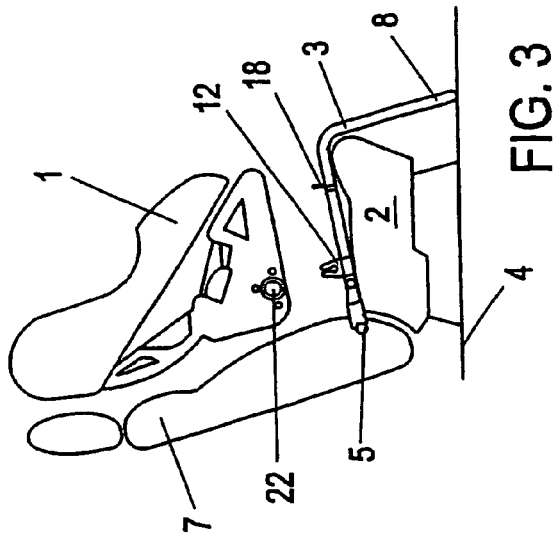

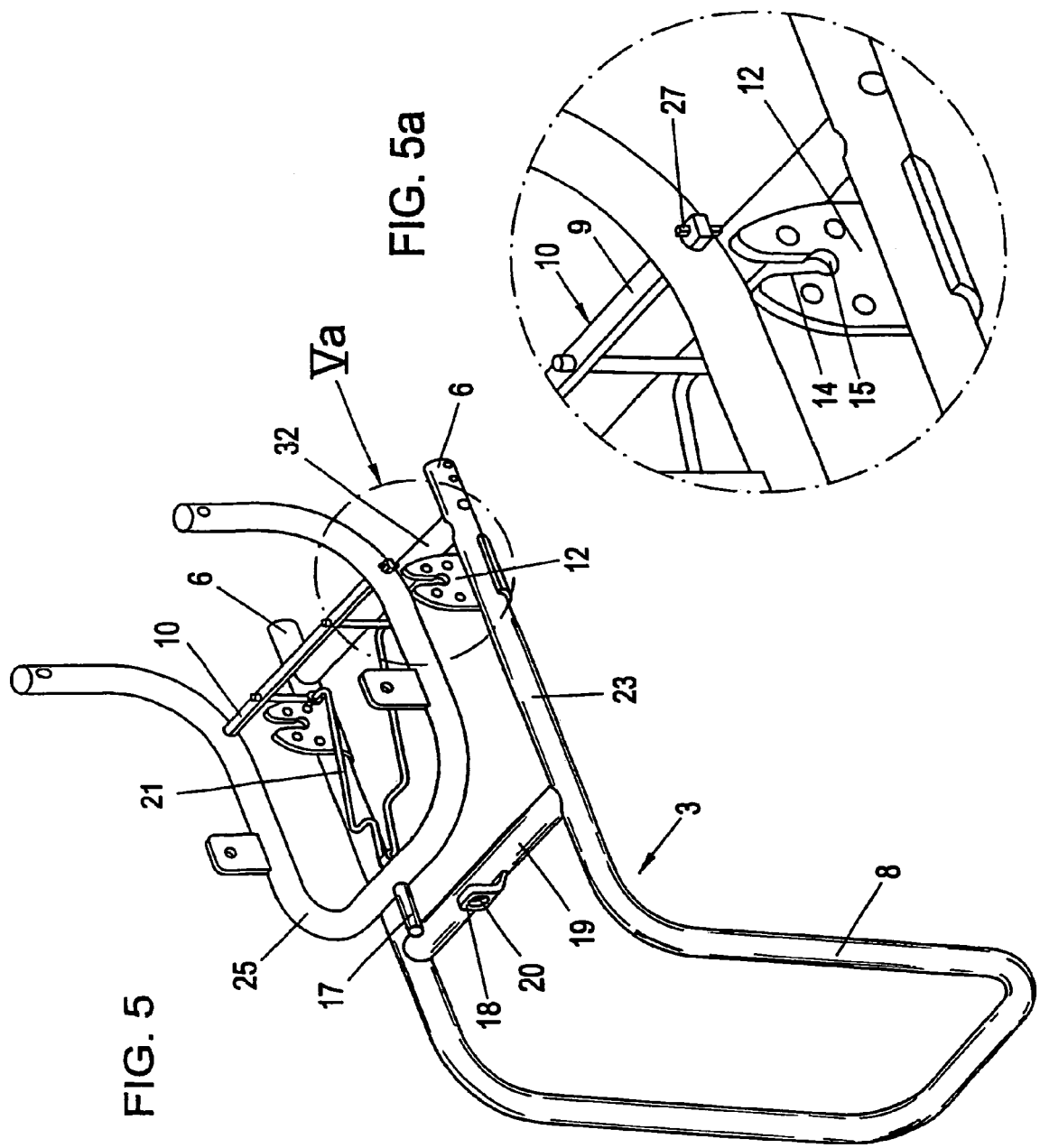

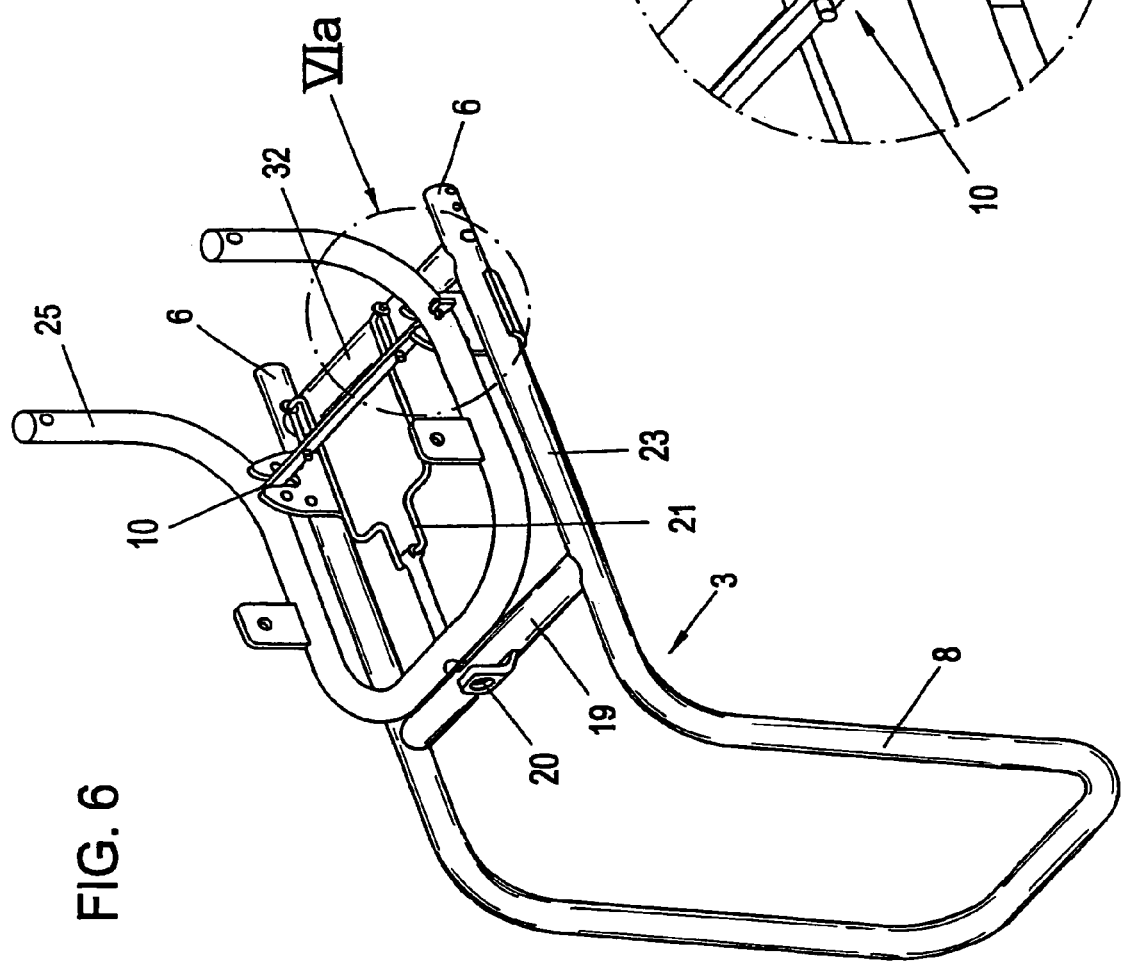
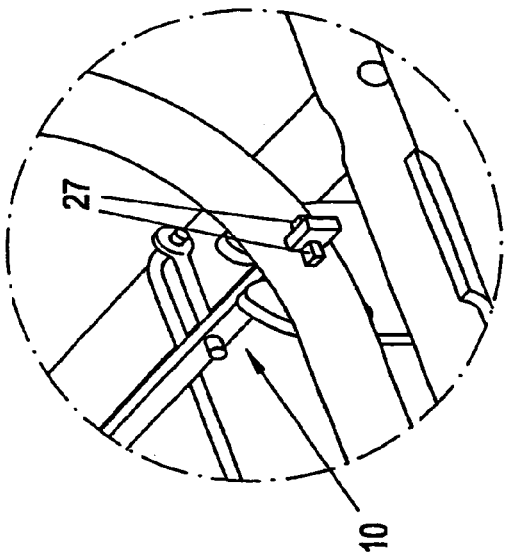

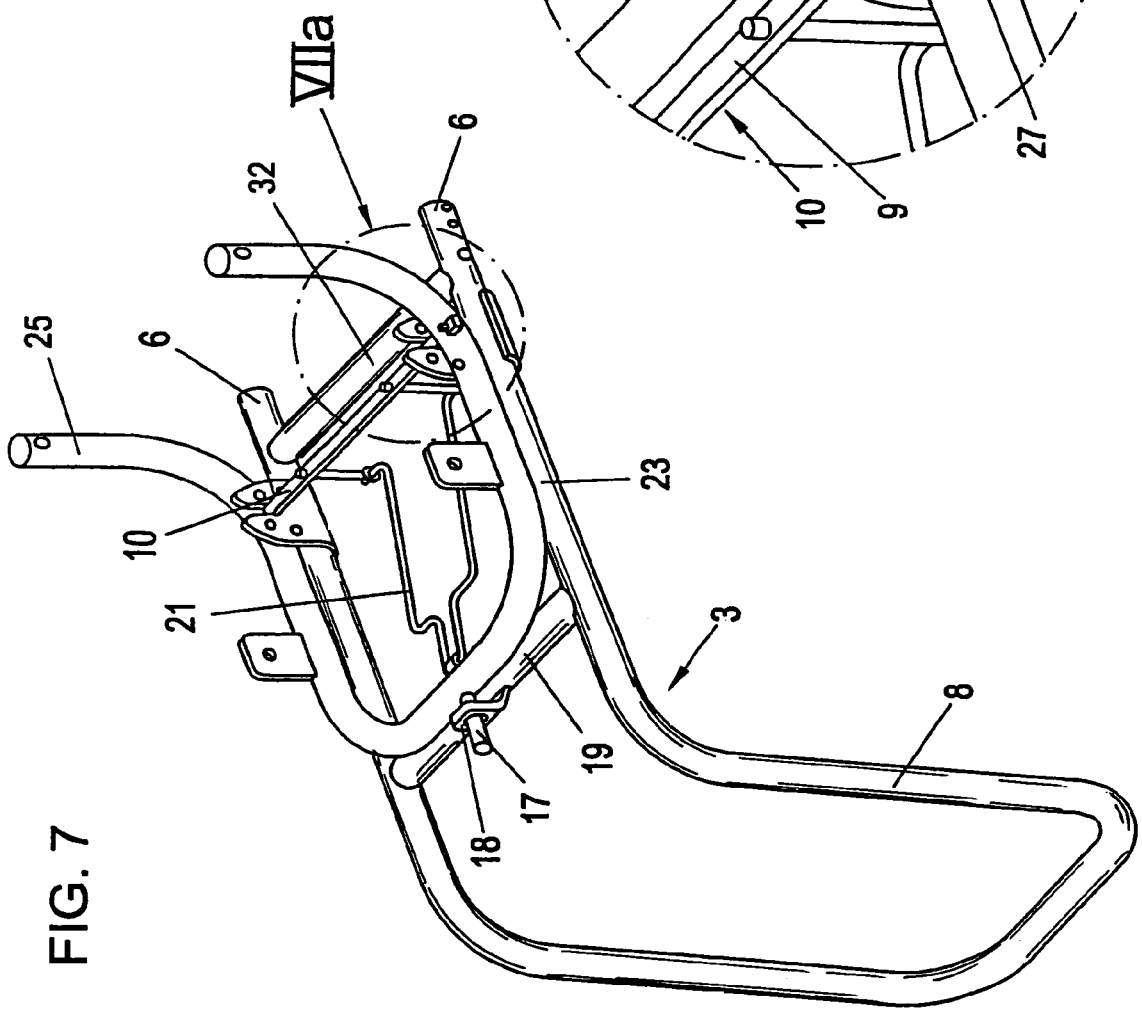
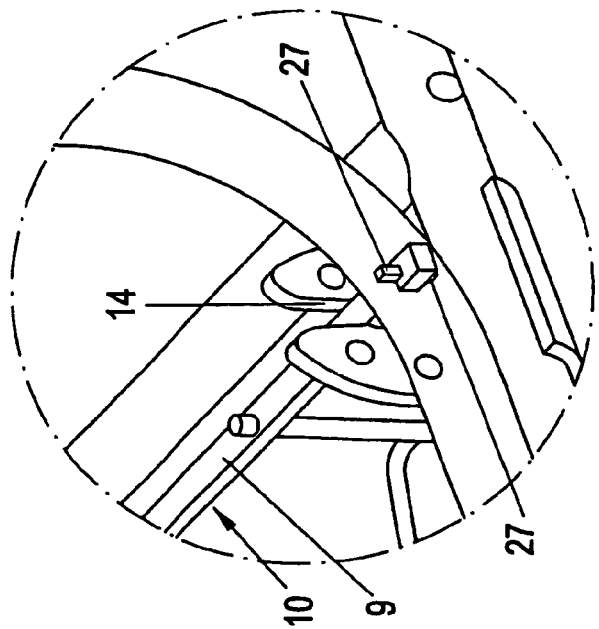

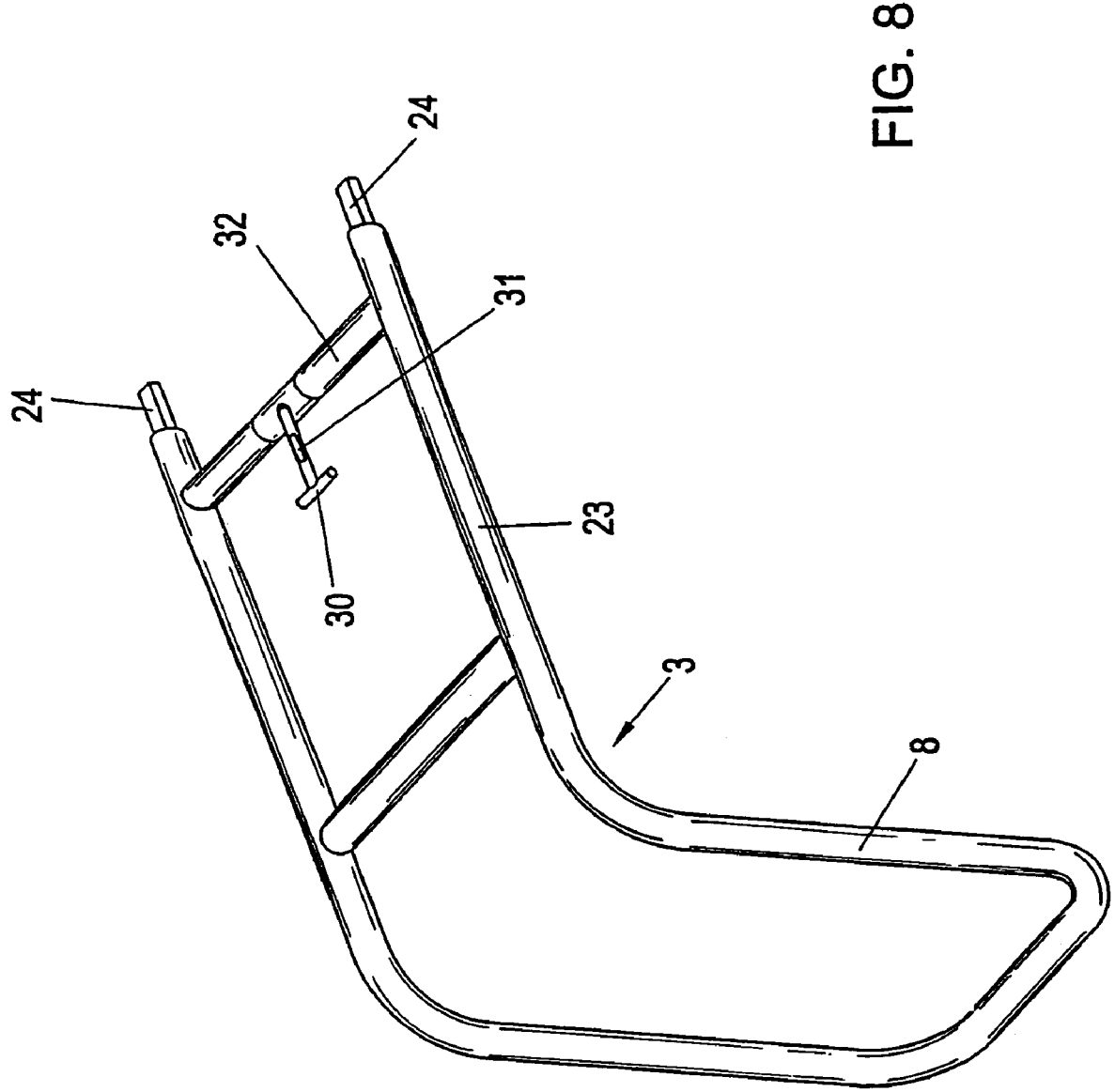

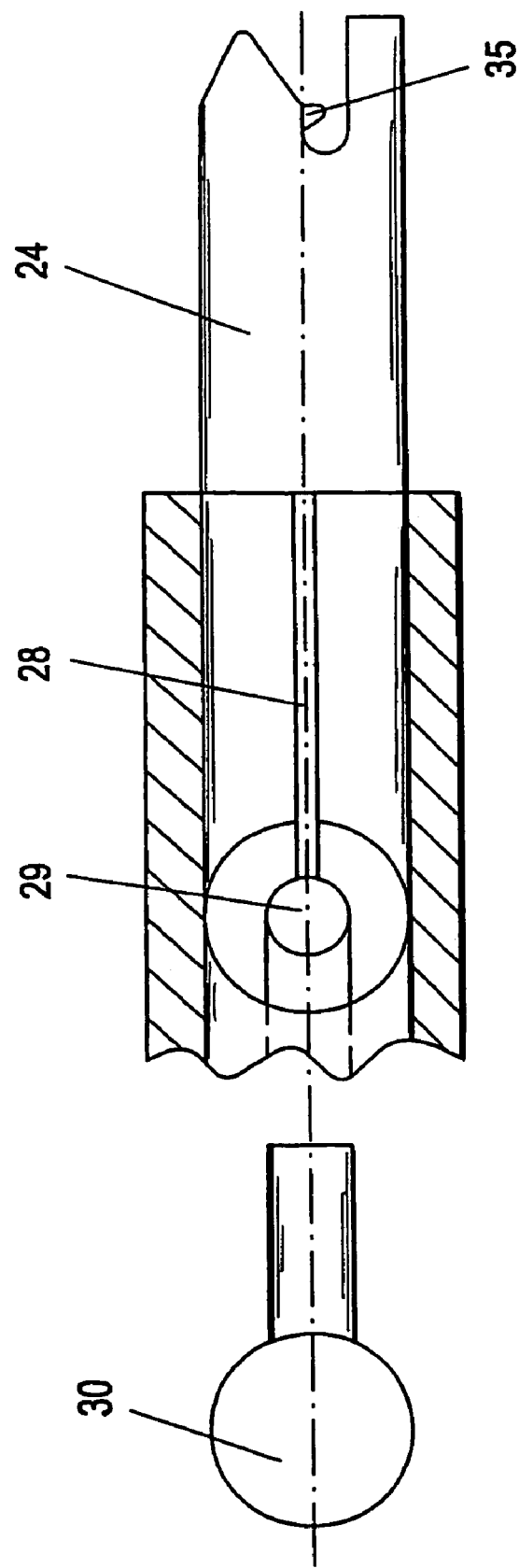

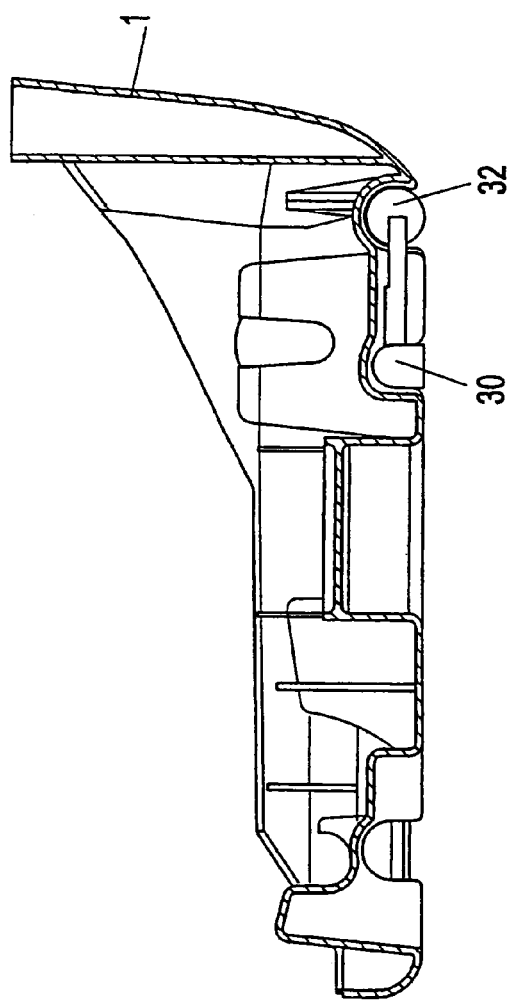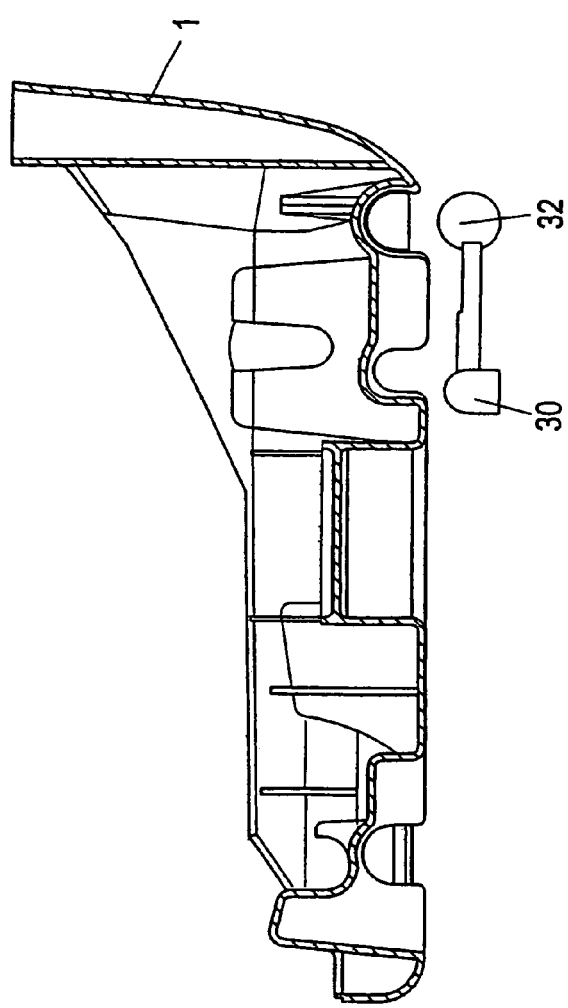

FRAME ASSEMBLY FOR MOUNTING BABY SEAT IN MOTOR-VEHICLE SEAT

CROSS REFERENCE TO RELATED APPLICATIONS

This application is the US national phase of PCT application PCT/EP2003/006503, filed 20 Jun. 2003, published 8 Jan. 2004 as WO 2004/002773, and claiming the priority of Austrian patent application A981/2002 itself filed 1 Jul. 2002.

FIELD OF THE INVENTION

The invention relates to a mounting frame for securing a baby seat in a motor vehicle as well as a restraint device with a baby seat for a motor vehicle that is provided with special-duty baby-seat anchors near a vehicle seat and solidly connected with the vehicle frame and/or the vehicle seat.

BACKGROUND OF THE INVENTION

The most commonly used child-restraint devices are used in the back seat or when there is no air bag or it can be turned off in the front seat and are held in place with the normally provided vehicle seat belt that is designed to fit around an adult. Such attachment has proven unsatisfactory mainly because the seat belt is not ideally positioned to hold a baby seat in place. Even when the belt is properly fitted, in an accident the deceleration of the restraint device and thus the deceleration of the child and of the vehicle itself are all cumulative to a normally somewhat loose belt connection and must be overcome.

In recent times a securing system for a child restraint has been developed that is described in ISO standard 13216-1. With such ISO devices it is required that the vehicle have baby-set anchors that are fixed to the vehicle frame or the vehicle seat. These baby-seat anchors that are for example formed as attachment eyes are engaged by elements that are for example formed as snap-type clips. Such anchoring elements are fixed on the frame of the baby seat. As a result of this solid connection of the baby seat with the vehicle frame the deceleration of the vehicle is transmitted directly to the baby seat and then to the child so that the potential of injury of the child is reduced.

The disadvantage of the ISO child restraint is that the child-restraint device with its anchoring elements are attached to the vehicle-fixed baby-seat anchors at a single axis so that rotation about this axis is possible and in an accident the child sitting in the child-restraint device is subjected to considerable angular deceleration.

Another disadvantage is that as a result of the different vehicle types, the geometry of the child-restraint device must be accommodated to the vehicle type and as a result many different styles of child restraint are needed, making mass production and stocking difficult for the retail outlet.

OBJECT OF THE INVENTION

It is an object of the invention to avoid the above-described disadvantages and to provide a device that increases the safety of transporting children in motor vehicles and that is universally usable in all types of vehicles. In addition it ensures that the anchor elements fit properly with the vehicle anchors.

SUMMARY OF THE INVENTION

This object is achieved in that the above-described mounting frame has a mounting part provided at one end with retaining elements for releasable connection of the mounting frame to the fixed vehicle baby-seat anchors and at the other end with a brace part that is braced forward of the vehicle seat on the vehicle floor or on the frame and that in the installed condition of the mounting frame extends at an acute angle forward and downward. Preferably the brace part forms with the vertical an angle of 10° to 15°. In addition to the ISO-standard mount that transmits the deceleration of the vehicle frame directly to the baby seat, according to the invention there is a bracing against the vehicle floor or the actual vehicle frame so as to prevent any rotation of the baby seat about the anchor axis so that the disadvantageous rotary acceleration in an accident is eliminated. The fact that the brace bow is inclined at an angle forward prevents any bending of the mounting frame in an accident.

To quickly connect the mounting frame with a baby seat the mounting part is provided with latch elements that fit with latch elements carried on the baby seat.

With a mounting frame for a backward-facing baby seat the mounting part has when installed a generally horizontal mounting leg and a rearwardly downwardly inclined anchor part that are preferably reinforced with a brace plate, the mounting leg being connected via a fixable pivot for bracing against the back of the motor-vehicle seat with an upwardly angled rear brace bow. This ensures that the support surface of the baby seat on the mounting frame is always the same, namely horizontal, which is important since different positions produce different dynamic performance in the event of an accident. The rear support bow prevents the child restraint from pivoting rearward in an accident so as to project a small child in the baby seat, who is facing backward, from being thrown forward.

According to a feature of the invention the retaining elements are movable by connector rods out of engagement with the vehicle-fixed baby-seat anchors.

Preferably the handle is provided with an indicator that shows the released or latched condition of the retaining element by showing the position of the handle relative to the mounting frame.

The connector rods extend in longitudinal elements and a transverse rod extends in a rear transverse strut of the mounting part of the mounting frame, the handle projecting out of the transverse strut.

Preferably the baby seat is releasably anchored to a mounting frame by a mounting device that is provided with at least one latch element that is movable between a freeing position and a latched position and that can be fitted in the freeing position into the latch elements fixed on the mounting frame and that in the locking position is movable for solidly locking the baby seat with the mounting frame in the rigid latch elements of the mounting frame. The baby seat can thus be easily taken off the mounting frame and set back on it and secured thereto. The latch elements on the baby seat as well as the latch elements on the mounting frame correspond are of a standard type so that one and the same baby seat can be locked to mounting frames fitted to different vehicle types. Thus it is only necessary to use the right mounting frame for the vehicle type and to join it to a standard baby seat. Even if, for example, it is necessary to switch a baby seat for one for a bigger child, the mounting frame does not have to be changed since the bigger baby seat can fit with the standardized latch elements of the mounting frame. Even stocking the baby seats is simpler for the retailer, as it is not necessary to have different baby seats for different cars.

According to a particular embodiment the mounting device has near a baby-seat back wall and parallel to it when installed a horizontal latch shaft that is provide at least on its ends at two sides and preferably along its entire length with parallel and diametrally opposite flats, the latch shaft being pivotal about its longitudinal axis out of a freeing position with the flats generally vertical into a latched position with the flats generally horizontal and that the longitudinal sides of the mounting frame are provided with two rigid lateral latch elements that are oriented opposite each other and that each have a vertical slot for an end of the latch shaft and formed with a lower undercut cylindrical seat in which the end of the latch shaft can move from its freeing position into its latched position. It is simplest if the flats extend the full length of the shaft.

Preferably the lateral latch elements of the mounting frame are V-shaped and have upwardly flared slots and the latch shaft has control pins that turn the latch shaft automatically into the freeing position when the baby seat is set on the mounting frame by engagement of the control pins of the latch shaft on edges of the slots of the latch elements of the mounting frame.

Advantageously the mounting device has near the baby-seat front edge a central latch pin shiftable in the vehicle longitudinal direction, carried on a front strut of the mounting frame, and having a longitudinally open hole in which the latch pin is longitudinally engageable to solidly lock the car seat with the mounting frame. The latch shaft engaging in the hole is, like the above-described latch shaft which fits with the latch elements, a simple but extremely effective latch. Both the latch shaft and the latch pin together provide a three-point attachment that creates a solid connection between the mounting frame and the baby seat.

Preferably the mounting device has an actuating device for the latch element by means of which all of the latch elements are shiftable into their respective latched position when the baby seat is fully fitted to the mounting frame. The actuating device is provided with one and preferably two knobs provided at ends of the latch shaft and serving to rotate the latch shaft as well as a longitudinally extending rigid crank arm that couples the latch shaft with the latch pin and that converts a rotation of the latch shaft into a sliding of the latch pin. Thus actuating the knobs simultaneously latches or unlatches the latch shaft and latch pin so as to provide a very simple installing and removing of the bay seat on the mounting frame. If the latch pin does not seat properly, the crank arm and the knob stay in the open position so as to clearly show this improperly installed condition.

Advantageously the actuating device has a biasing element, e.g. a weight or spring, urging the latch elements automatically into the latched positions and by means of which installing the baby seat puts them back in their blocking position when the baby seat is fully fitted to the mounting frame so as to provide an automatic latching as the baby seat is set in place.

BRIEF DESCRIPTION OF THE DRAWING

To illustrate the invention the baby-holding device and the mounting frame according to the invention are described again with reference to the attached drawing. Therein:

FIGS. 1-4 show the installation steps of the mounting frame on the vehicle-mounted fixed baby-seat anchors as well as the securing of the baby seat to the mounting frame.

FIGS. 5, 5a, 6, 6a, 7, and 7a show an embodiment of the latch mechanism between the baby seat and the mounting frame.

FIG. 8 shows the mounting frame with the unlatching system for the retaining elements.

FIG. 9 shows a section in the region of the rear transverse strut of the mounting frame.

FIG. 10 shows a section through the baby seat set on the mounting frame with latched retaining elements.

FIG. 11 shows that the baby seat cannot be installed with released retaining elements.

SPECIFIC DESCRIPTION

Figure 12:
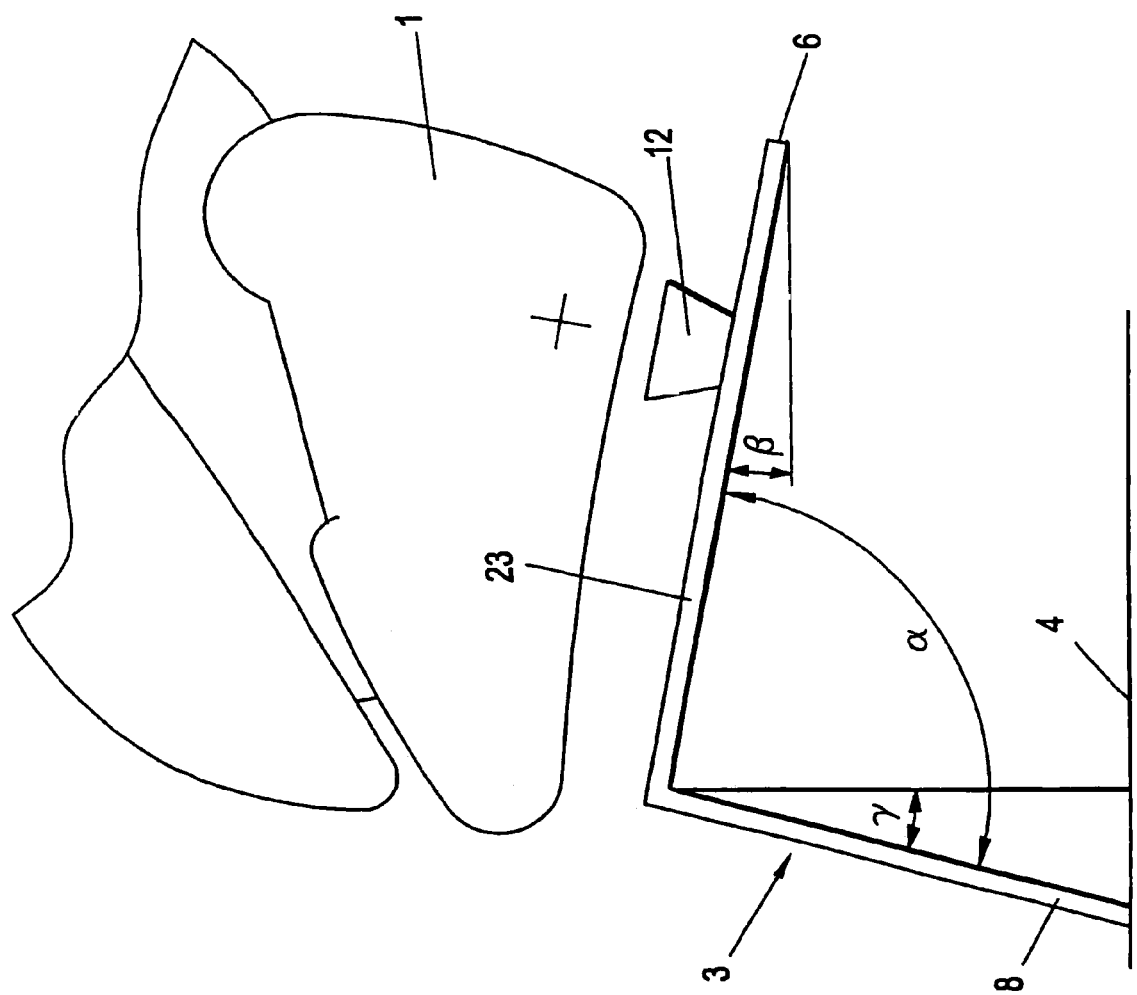
FIG. 12 schematically shows a mounting frame on which a forward-facing baby seat can be secured.

FIG. 1 shows motor-vehicle seat mounted on a motor-vehicle floor 4 and having a back 7, a seat 2, and baby-seat anchors 5 fixed in the vehicle. A mounting frame 3 has a mounting part 23 and a bracing part shaped as a bow 8. The mounting part 23 of the mounting frame 3 carries latch elements 12 and at its rear end retaining elements 24.

In FIG. 2 the retaining elements 24 are engaged with the vehicle-fixed baby-seat anchors 5. The support frame 8 stands on the vehicle floor 4.

In FIG. 3 one can see how the baby seat 1 is set from above onto the mounting frame 3. As it is set down, a locking shaft having knobs 22 on its end snaps in place in the latch elements 12 and a latching pin that is provided on the front lower side of the baby seat 1 snaps into the front latch elements 18.

Finally, FIG. 4 shows the baby seat when mounted on the mounting frame 3. The baby seat 1 is so shaped on its underside that it fits around the mounting frame 3.

FIGS. 5, 6, and 7 show a possible embodiment of the latching mechanism between the mounting frame 3 and a frame 25 of the baby seat. The unlatching system provided in the mounting frame 3 for the retaining elements is not shown in these figures for clarity's sake.

FIGS. 5a, 6a, and 7a show in large scale the details indicated respectively at Va, VIa, and VIIa in respective FIGS. 5, 6, and 7. The mounting frame 3 has the mounting part 23 and a brace part in the shape of the brace bow 8. In front of the mounting part 23 there is a front transverse strut 19 that carries in its center a front latch element 18 in which a hole 20 is formed. At the rear of the mounting part 23 the mounting frame has a rear strut 32. Rear ends 6 of the mounting frame 3 connect to the vehicle anchors that are not shown in FIGS. 5, 6, and 7. Immediately forward of the rear strut 32 are lateral rear latch elements 12 on the mounting frame 3 that have generally vertical slots 14 that are upwardly flared and at their lower ends are formed with undercut cylindrical seats 15. The frame 25 that is fixed on the baby seat has in its region near the baby-seat back a latch shaft 10 having diametrally opposite flats 9. The latch shaft 10 is connected by a rigid crank arm 21 with a latch pin 17 such that on rotation of the latch shaft 10 the latch pin 17 is shifted longitudinally. In a latched position the flats of the latch shaft are horizontal and the latch pin 17 projects out of the frame 25. In a freeing position the flats 9 of the latch shaft 10 are vertical and the latch pin 17 is retracted so that it does not project from the frame 25. An unillustrated biasing element, such as a weight or a spring, can be provided to urge the latch shaft 10 and the latch pin 17 into the latched position so that release is only possible by overcoming the force of the biasing element.

Before setting the baby seat on the mounting frame 3 the latch shaft 10 and the latch pin 17 are in the latched position, that is the flats 9 are horizontal and the latch pin 17 projects from the frame 25 of the baby seat. As the baby seat is set on the mounting frame 3 the latch shaft 10 engages with its control pins 27 into the V-shaped slots 14 so that the latch shaft 10 rotates into the freeing position since only in this position can it fit into the slots 14 (see FIGS. 6 and 6a). Simultaneously with rotation of the latch shaft 10 the latch pin 17 is retracted. Then the latch shaft 10 fits into the seats 15 of the slots 14, which undercut seats 15 are wider than the slots 14, so that the latch shaft 10 is pivoted by the force of the biasing element back into the latched position so that as shown in FIG. 7 the flats 9 of the latch shaft 10 are horizontal and the latch pin 17 again projects and fits into the hole 20. In this manner the baby seat 1 is secured at three points, namely at the two back and the one front retaining element on the mounting frame 3.

In order to release the baby seat, for example, the latch shaft 10 has rotary knobs as shown in FIGS. 3 and 4 at 22. The latch shaft 10 can be turned into the freeing position by one of these knobs 22 and the baby seat can be raised from the mounting frame 3.

FIG. 8 shows the mounting frame 3 with an unlatching system for the retaining elements 24 according to the invention, the FIG. 9 sectional view illustrating functioning of the unlatching system at the rear strut 32. The retaining elements 24 have respective latch hooks 35 that can be moved by respective connector rods 28 out of their retaining positions. The two connector rods 28 extend in the longitudinal elements of the mounting part 23 of the mounting frame 3 and are interconnected by a transverse rod 29 that extends in the transverse strut 32. This transverse rod 29 has a pull handle 30 by means of which the connector rods 28 and their hooks 35 can be actuated. The pull handle 30 has a tubular longitudinal portion and has a position indicator 31 formed as a window through which a pointer fixed on the transverse strut 32 can be seen so as to indicate the position of the handle 30 relative to the mounting frame 3. Before securing the retaining elements 24 to the baby-seat anchors 5 in the vehicle the latch hooks 35 are raised and the handle 30 is in its fully pulled-out position on the rear strut 32. The indicator 31 shows that the mounting frame 3 is not latched. If now the retaining elements 24 are shifted toward the baby-seat anchors 5, the latch hooks 35 are pushed downward. The connector rods 28 are shifted toward the retaining elements 24 and the handle 30 is moved by the transverse rod 29 into a position close to the transverse strut 32. The indicator 31 will show the proper anchoring of the retaining elements 24 with the baby-seat anchors 5 in the vehicle.

FIGS. 10 and 11 show a section through a baby seat, with FIG. 10 showing it properly fitted to the mounting frame 3 and FIG. 11 showing it offset from the mounting frame 3 since the handle 30 is in its outer position relative to the strut 32 because the retaining elements 24 are not locked. In this position the strut 32 and the handle 30 do not fit in the recess of the housing of the baby seat.

FIG. 12 schematically illustrates a mounting frame 3 that as in FIGS. 1 to 4 can carry a forward-facing baby seat. The mounting part 23 is fixed at its rear ends 6 by retaining elements with the vehicle baby-seat anchor and is supported by the brace part 8 on the vehicle floor 4. The angle α between the mounting part 23 and the brace part 8 is obtuse and in this case is 95°. The brace part forms an angle γ with the vertical, in this case 15°. An angle β between the mounting part 23 and the horizontal is about 10° and corresponds to the normal inclination of the seat surface of motor-vehicle seats, which is normally 15°±10° to the horizontal. The baby seat 1 is shown schematically.

Figure 13:
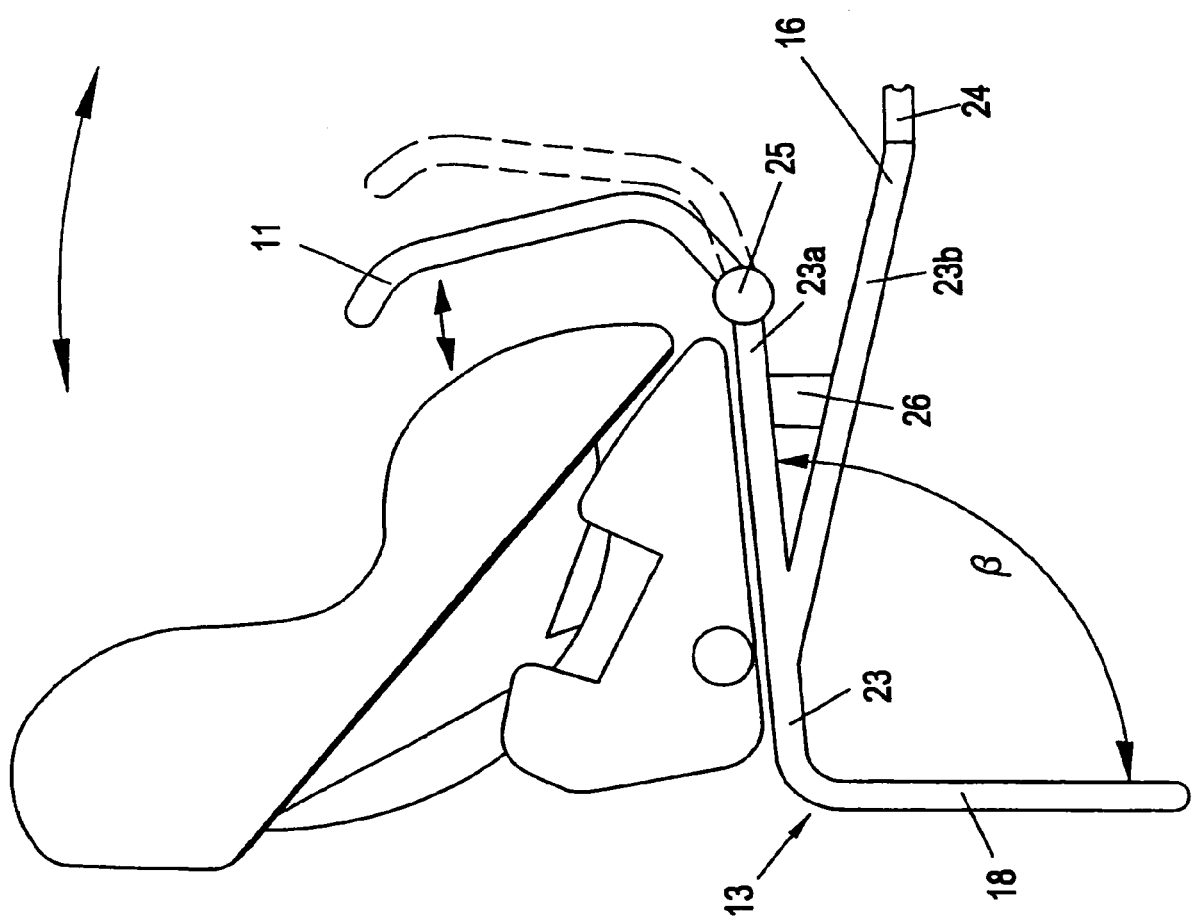
FIG. 13 shows a mounting frame on which a rearward-facing baby seat can be mounted.

Finally, FIG. 13 shows a mounting frame 13 that is set up to hold a rearward-facing baby seat 1, in this case the mounting part 23 has two legs, a horizontal mounting leg 23a on which the baby seat 1 is mounted and a downwardly extending anchor leg 23b that carries on its rear end 16 the retaining elements 24 for latching to the vehicle baby-seat anchors. The mounting leg 23a forms with the brace part 18 an angle β of 95°. The horizontal mounting leg 23a ends under the tip of the baby-seat floor and the brace bow 11 is engaged there by a fixable link 25 that makes it pivotal. This is necessary since the seat back has a variable angle and the frame must be as solidly mounted as possible to prevent rotation in rebound. The mounting of the baby seat 1 is effected by the latch elements 12 that are near the front edge of the seat of the vehicle seat on the mounting part 23 of the mounting frame 13. In order to withstand forces produced in an accident, the mounting leg 23a and the anchoring leg 23b are also reinforced by a plate 26.

The invention claimed is:

1. In combination:
   a motor vehicle provided with a vehicle seat having a back and with special-duty baby-seat anchors near the seat and solidly connected with the vehicle or the vehicle seat; and
   a mounting frame for a backward-facing baby seat, the frame having a mounting part provided at one end with retaining elements for releasable connection of the mounting frame to the vehicle baby-seat anchors and at the other end with a brace part that is braced forward of the vehicle seat on the vehicle and that in the installed condition of the mounting frame extends at an acute angle forward and downward, the mounting part having when installed with the backward-facing baby seat a generally horizontal mounting leg and a rearwardly downwardly inclined anchor part, the mounting leg being connected via a fixable pivot for bracing against the back of the motor-vehicle seat with an upwardly angled rear brace bow.

2. In combination:
   a motor vehicle provided with a vehicle seat and with special-duty baby-seat anchors near the seat and solidly connected with the vehicle or the vehicle seat; and
   a mounting frame having a mounting part provided at one end with retaining elements for releasable connection of the mounting frame to the vehicle baby-seat anchors and at the other end with a brace part that is braced forward of the vehicle seat on the vehicle and in the installed condition of the mounting frame extends at an acute angle forward and downward, the retaining elements being movable by connector rods out of engagement with the vehicle baby-seat anchors.

3. The mounting frame according to claim 2 wherein a handle connected to the retaining elements is provided with an indicator that shows a released or latched condition of the retaining element by showing a position of the handle relative to the mounting frame.

4. The mounting frame according to claim 3 wherein the connector rods extend in longitudinal elements and a transverse rod extends in a rear transverse strut of the mounting part of the mounting frame, the handle projecting out of the transverse strut.

5. In combination:
a motor vehicle provided with a vehicle seat and with special-duty baby-seat anchors near the seat and solidly connected with the vehicle or the vehicle seat;
a mounting frame having a mounting part provided at one end with retaining elements for releasable connection of the mounting frame to the vehicle baby-seat anchors and at the other end with a brace part that is braced forward of the vehicle seat on the vehicle and that in the installed condition of the mounting frame extends at an acute angle forward and downward;
a baby seat having a back wall and a front edge; and
a mounting device that is on the baby seat, that releasably attaches to the mounting frame, and that is provided with at least one first latch element that is movable between a freeing position and a latched position, that can be fitted in the freeing position into second latch elements fixed laterally on the mounting frame, and that in the latched position solidly locks the baby seat with the mounting frame in the second latch elements of the mounting frame.

6. The mounting frame according to claim 5 wherein the brace part forms with the vertical an angle of 10° to 15°.

7. The mounting frame according to claim 6 wherein the mounting part is provided with latch elements that fit with latch elements carried on the baby seat.

8. The child restraint device according to claim 5 wherein the mounting device has near the baby-seat back wall and parallel thereto when installed a horizontal latch shaft that is provided at least on its ends at two sides with parallel and diametrally opposite flats, the latch shaft being pivotally oriented relative to its longitudinal axis in the freeing position with the flats generally vertical and being pivotal from the freeing position into a latched position with the flats generally horizontal, longitudinal sides of the mounting frame being provided with the two second latch elements that are rigid and oriented opposite each other and that each have a vertical slot for a respective one of the ends of the latch shaft and formed with a lower undercut cylindrical seat in which the respective end of the latch shaft can move from the freeing position into the latched position.

9. The child restraint device according to claim 8 wherein the second latch elements of the mounting frame are V-shaped and formed with the slots and the latch shaft has control pins that turn the latch shaft into the freeing position when the baby seat is set on the mounting frame by engagement of the control pins of the latch shaft on edges of the slots of the second latch elements of the mounting frame.

10. The child restraint device according to claim 5 wherein the mounting device has near the baby-seat front edge a central latch pin shiftable in the vehicle longitudinal direction, carried on a front strut of the mounting frame, and having a longitudinally open hole in which the latch pin is longitudinally engageable to solidly lock the baby seat with the mounting tart of the mounting frame.

11. The child restraint device according to claim 10 wherein the actuating device is provided with at least one knob provided at least one end of the latch shaft and serving to rotate the latch shaft as well as a longitudinally extending rigid crank arm that couples the latch shaft with the latch pin and that converts a rotation of the latch shaft into a sliding of the latch pin.

12. The child restraint device according to claim 5 wherein the mounting device has an actuating device for the respective latch elements by means of which all of the respective latch elements are shiftable into their respective latched position when the baby seat is fully fitted to the mounting part of the mounting frame.

13. The child restraint device according to claims 12 wherein the actuating device has a biasing element urging the latch elements automatically into the latched positions and by means of which installing the baby seat puts them back in their latched position when the baby seat is fully fitted to the mounting part of the mounting frame.

14. The child restraint device according to claim 5 wherein a housing of the baby seat has on its side turned toward the mounting frame recesses for receiving the mounting frame in the latched position of the mounting elements.

15. A child restraint device with a baby seat for motor vehicles provided with special-duty baby-seat anchors on a vehicle seat and solidly connected with the vehicle frame or the vehicle seat wherein the baby seat is releasably anchored to a mounting frame according to claim 5 and engaged over a motor-vehicle seat.

* * * * *